(12) United States Patent
Ismail et al.

(10) Patent No.: US 6,829,930 B2
(45) Date of Patent: Dec. 14, 2004

(54) GAS VELOCITY AND TEMPERATURE SENSOR SYSTEM

(75) Inventors: Raouf A. Ismail, Concord, MA (US); Clarke Bailey, Jaffrey, NH (US); Karl Y. Hiramoto, Leominster, MA (US)

(73) Assignee: Degree Controls, Inc., Milford, NH (US)

(*) Notice: Subject to any disclaimer, the term of this patent is extended or adjusted under 35 U.S.C. 154(b) by 355 days.

(21) Appl. No.: 10/157,266

(22) Filed: May 29, 2002

(65) Prior Publication Data

US 2003/0225544 A1 Dec. 4, 2003

(51) Int. Cl.$^7$ ............................................... G01F 1/68
(52) U.S. Cl. ............................................ 73/204.11
(58) Field of Search ........................... 73/202.5, 204.11, 73/204.16, 204.18, 204.19, 204.23, 204.25

(56) References Cited

U.S. PATENT DOCUMENTS

| | | | |
|---|---|---|---|
| 4,733,541 A | | 3/1988 | Ismail et al. ................. 62/186 |
| 5,218,866 A | * | 6/1993 | Phillips et al. ........... 73/204.15 |
| 5,511,415 A | | 4/1996 | Nair et al. ................. 73/204.11 |
| 5,525,040 A | * | 6/1996 | Andreae et al. ............... 417/32 |
| 5,582,628 A | * | 12/1996 | Wood ....................... 73/204.18 |
| 5,792,951 A | | 8/1998 | Ismail et al. ............. 73/204.11 |
| 5,929,333 A | | 7/1999 | Nair ........................ 73/204.11 |
| 6,640,626 B2 | * | 11/2003 | Saikalis et al. .......... 73/204.11 |

* cited by examiner

Primary Examiner—Edward Lefkowitz
Assistant Examiner—Corey D. Mack
(74) Attorney, Agent, or Firm—Iandiorio & Teska

(57) ABSTRACT

A gas velocity and temperature sensor system comprising a first thermistor driven at a constant temperature and configured to output a flow signal representative of the power dissipated as a function of the gas velocity and a temperature signal representative of the temperature of the first thermistor, a second thermistor configured to output a gas temperature signal representative of the gas temperature proximate the second thermistor, and a processor responsive to the flow signal and the temperature signals, the processor configured to calculate gas velocity using an empirically derived equation in which gas flow velocity is function of a constant and the ratio of the power dissipated to the temperature difference between the temperature of the first thermistor and the gas temperature proximate the second thermistor, the processor deriving a signal representing the gas velocity.

48 Claims, 12 Drawing Sheets

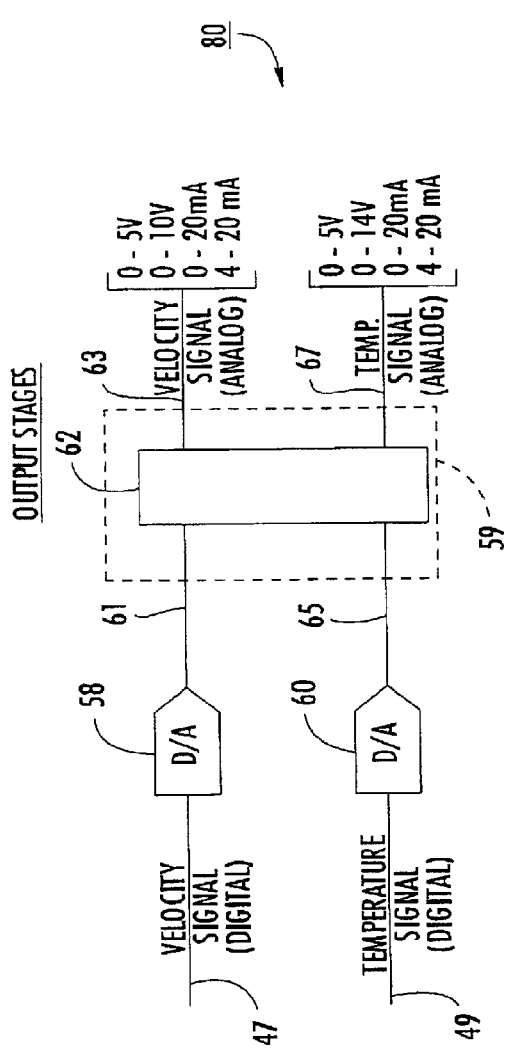
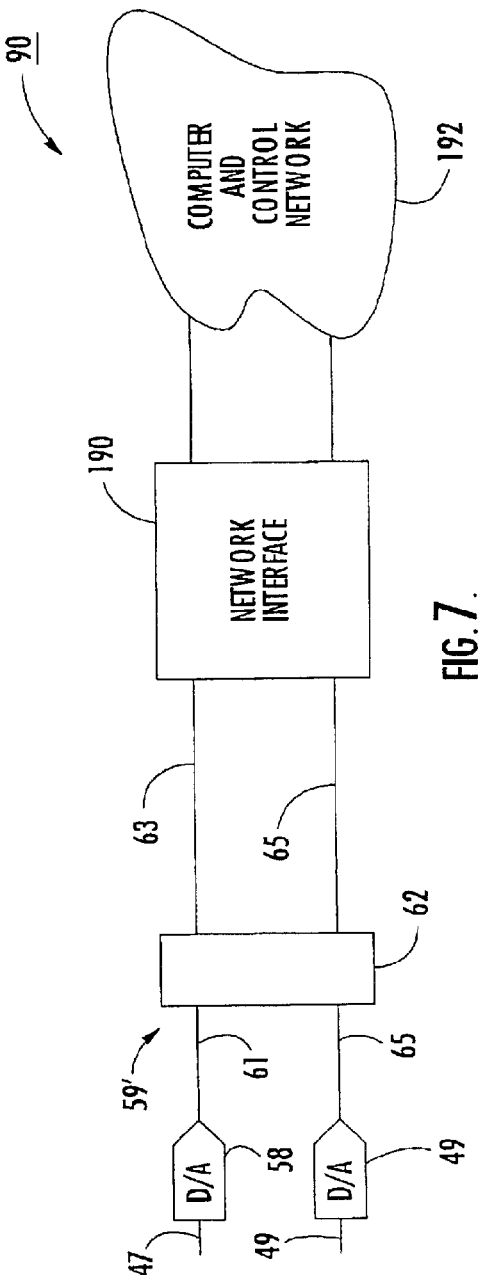

GAS VELOCITY AND TEMPERATURE SENSOR SYSTEM

FIELD OF THE INVENTION

This invention relates to an improved gas flow velocity and temperature sensor system and more particularly to a gas flow velocity and temperature sensing system utilizing a processor configured to use an empirically derived equation which more accurately calculates the gas flow velocity and temperature proximate a sensor.

BACKGROUND OF THE INVENTION

Gas velocity and temperature sensors are used to monitor the gas (e.g., air) flow velocity and the temperature proximate sensitive electronic components, and also in refrigeration systems, gas conditioning systems, biocontainment systems, gas supply applications, industrial process control of gas mixing, weather applications and any application which requires monitoring of gas flow. For example, in electronic systems with heat generating components, failure to maintain sufficient gas flow within the system can result in damage to the sensitive electronics of the system. In biocontainment systems, failure to maintain the correct gas flow within the system can result in overheating or overcooling the biocontainment area killing the organisms within the system. In gas conditioning systems, gas supply applications, gas mixing, and weather applications, measuring the gas flow velocity and temperature within the system is key to operation of the system.

The inventors hereof have invented gas flow and temperature sensors/probes and circuits which facilitate easy access to even difficult locations by employing a small sensor comected over a long, flexible, small cross-sectional area of cable for providing a measurement of the gas flow velocity and temperature along with calibration data characterizing the response of the particular probe sensor and circuitry. See U.S. Pat. Nos. 5,929,333, 5,792,951, 5,511,415, and 4,733,541, incorporated herein in their entirety by these references.

These gas velocity sensors and probes, as well as other prior art gas velocity sensors/probes, typically employ two thermistors to calculate gas flow velocity and temperature. A thermistor is a thermally sensitive resistor which exhibits a change in electric resistance due to a change in temperature. One thermistor is typically maintained at the temperature of the gas flow being measured and a circuit connected to this thermistor is configured to output a temperature signal proportional to the gas temperature. The other thermistor is maintained at a chosen temperature which is significantly higher than the temperature of the gas being measured (e.g., a "hot" thermistor 100° C. above the temperature of the gas being measured). Because the resistance and temperature of a thermistor are related by a characteristic curve, a specific chosen temperature of the hot thermistor relates to specific resistance of the thermistor. A constant temperature servo connected to the hot thermistor maintains the hot thermistor at a constant resistance representative of the chosen temperature and outputs a measure of the power required to maintain the thermistor at the chosen resistance. When the hot thermistor is subjected to an increase or decrease in gas flow, it causes an increase or decrease in the power requirements of the constant temperature servo to maintain the hot thermistor at the constant resistance (representative of the chosen temperature). Typically, the constant temperature servo is configured to output a signal representative of the power dissipated as a function of gas velocity and the temperature proximate the thermistor.

Prior art gas flow velocity sensor systems may then employ a processor which receives the signal representative of the power dissipated as a function of gas velocity, the temperature signal representative of gas temperature proximate the hot thermistor, and the temperature signal representative of temperature of the gas being measured (often called the "ambient temperature"). The microprocessor of these prior art gas flow velocity sensors then calculates the gas flow velocity proximate the sensor using King's law as shown below:

$$P = E_v^2/R_v = \left(Ak + Bk\left(\frac{\mu C_P}{k}\right)^{0.33} Re^n\right)(T_v - T_A) \quad (1)$$

where P and $E_v^2/R_v$ is the power dissipated in a hot wire of infinite length, A, B, and n are constants derived via flow calibration, k is the fluid's thermal conductivity, $C_P$ is heat capacity, $R_e$ is the Reynolds number, $T_v$ is the temperature of the wire, and $T_A$ is the ambient temperature. The Reynolds number in expanded form is:

$$Re = \frac{\rho v d}{\mu},$$

where p is the gas density, v is fluid (gas) velocity, d is the diameter of the wire, and $\mu$ is the gas viscosity. Equation (1) is solved for v to calculate the gas velocity as follows:

$$\text{gas velocity} = v = K_2 \cdot \left[\frac{[E_v^2 - K_0 \cdot (Tv - Ta)]}{K_1 \cdot (Tv - Ta)}\right]^{2.37} \quad (2)$$

Based on the measured gas velocity, a feedback loop can be used to control gas velocity, and thus the temperature of, for example, an equipment cabinet or biocontainment system.

Prior art sensors and probes which rely on King's law to calculate gas velocity, however, produce inaccurate readings because King's law is based on the approximation that the hot thermistor is a hot filament of infinite length when in fact it is not.

SUMMARY OF THE INVENTION

It is therefore an object of this invention to provide an improved gas velocity and temperature sensor system.

It is a further object of this invention to provide such a sensor system which accurately measures the gas flow velocity and temperature proximate a sensor.

It is a further object of this invention to provide such a sensor system which refines the approximation used to calculate gas flow velocity.

It is a further object of this invention to provide such a sensor system which calculates gas flow velocity and temperature proximate a sensor without the errors associated with the approximation associated with King's law.

The invention results from the realization that a truly effective gas flow and temperature sensor can be effected by providing a first thermistor driven at a constant temperature higher than the gas temperature being measured and which outputs a signal representative of the power dissipated as a function of gas velocity, a second thermistor which measures the gas temperature and which outputs a signal representative of the gas temperature, and a microprocessor configured to calculate a more accurate representation of the gas flow velocity and temperature, not by using King's law which relies on the erroneous approximation that the thermistor is a hot wire of infinite length, but, instead, by utilizing a innovative and significantly more accurate empirically derived equation which reduces the error of approximation associated with King's law to yield a significantly more accurate measurement of gas flow velocity and temperature proximate the sensor.

This invention features a gas velocity and temperature sensor system comprising a first thermistor driven at a constant temperature and configured to output a flow signal representative of the power dissipated as a function of the gas velocity and a temperature signal representative of the temperature of the first thermistor, a second thermistor configured to output a gas temperature signal representative of the gas temperature proximate the second thermistor, and a processor responsive to the flow signal and the temperature signals. The processor is configured to calculate gas velocity using an empirically derived equation in which gas flow velocity is a function of a constant and the ratio of the power dissipated to the temperature difference between the temperature of the first thermistor and the gas temperature proximate the second thermistor, the processor deriving a signal representing the gas velocity. Ideally, the processor derives a signal representing the temperature of the gas proximate the second thermistor.

In one preferred embodiment the empirically derived equation is $$v \cong \left[\frac{kP}{\Delta T}\right]^{5/2}$$

where k is the constant representing calibration constants of the first and second thermistors, P is the power dissipated, and $\Delta T$ is the difference between the temperature of the first thermistor and the gas temperature proximate the second thermistor.

In one example of this invention, a non-volatile memory is configured to store the constant k accessible and readable by the processor to calculate the gas velocity from the empirically derived equation. Typically, the processor stores the constant k accessible to calculate the gas velocity from the empirically derived equation. Preferably the flow signal and the temperature signals are voltages, but alternatively the flow signal and the temperature signal may be currents.

In one design of this invention, a constant temperature servo may be connected between the first thermistor and the processor to drive the first thermistor at a constant resistance equal to a predetermined constant temperature. Typically, an amplifier circuit may be connected between the second thermistor and the processor to amplify the gas temperature signal output by the second thermistor. Ideally, an analog-to-digital converter is connected between the constant temperature servo and the processor configured to convert the flow signal and the temperature signal of the first thermistor to a digital flow signal and a first digital temperature signal. The gas velocity sensor system of this invention may also include an analog-to-digital converter connected between the amplifier circuit and the processor configured to convert the gas temperature signal to a second digital temperature signal. In one embodiment, the gas velocity sensor system of this invention includes a digital-to-analog converter connected between the processor and an output drive circuit configured to convert the signal representing the gas flow velocity and the signal representing the temperature of the gas derived by the processor to an analog flow signal and an analog temperature signal. In a preferred example, the drive circuit is configured to condition the analog flow signal and analog temperature signal to be output in the range of 0–5 volts, or alternatively in the range of 0–10 volts. In another example, the drive circuit may be configured to condition the analog flow signal and analog temperature signal to be output in the range of 0–20 milliamperes, or 4–20 milliamperes.

This invention also features a gas velocity and temperature sensor system comprising a first thermistor driven at a constant temperature and configured to output a flow signal representative of the power dissipated as a function of the gas velocity and a temperature signal representative of the temperature of the first thermistor, a second thermistor configured to output a gas temperature signal representative of the gas temperature proximate the second thermistor, and a processor responsive to the flow signal and the temperature signals. The processor is configured to calculate gas velocity using an empirically derived equation in which gas flow velocity is the function of a constant and the ratio of the power dissipated to the temperature difference between the temperature of the first thermistor and the gas temperature proximate the second thermistor. The processor derives a signal representing the gas flow velocity and a signal representing the temperature of the gas.

This invention also features a gas velocity and temperature sensor system comprising a first thermistor driven at a constant temperature and configured to output a flow signal proportional to the power dissipated as a function of the gas velocity and a temperature signal representative of the temperature of the first thermistor, a second thermistor configured to output a gas temperature signal proportional to the gas temperature proximate to the second thermistor, and a processor responsive to the flow signal and the temperature signals configured to calculate gas velocity using the empirically derived equation:

$$v \cong \left[\frac{kP}{\Delta T}\right]^{5/2},$$

where k is a constant, P is the power dissipated as a function of the gas velocity, and $\Delta T$ is the difference between the temperature of the first thermistor and gas temperature proximate to the second thermistor, the processor deriving a signal representing the gas velocity.

Ideally, the processor derives a signal representing the temperature of the gas. Typically, a non-volatile memory configured to store the constant k which represents the calibration coefficients of the first and second thermistors, the memory readable by the processor to calculate the gas velocity from the empirically derived equation.

In one design, the gas velocity and temperature sensor system of this invention includes a first thermistor driven at a constant temperature and configured to output a flow signal representative of the power dissipated as a function of the gas velocity and a temperature signal representative of the temperature of the first thermistor, a second thermistor configured to output a gas temperature signal representative of the gas temperature proximate to the second thermistor, a processor responsive to the flow signal and the temperature signals configured to calculate the gas velocity proximate the sensor using the empirically derived equations:

$$x = k_0 \frac{(F - F_0)^2}{\Delta T} - k_1 \Delta T - k_2 T_A + k_3 \text{ and}$$

$$\text{gas velocity} = k_4 x^{k_7} + k_5 \frac{1}{x^2} + k_6,$$

where x is the compensated power, F is the power dissipated in the first thermistor as a function of the gas velocity, $F_0$ is the quiescent power of the first thermistor, $\Delta T$ is the difference between temperature of the first thermistor and the gas temperature proximate the second thermistor, $k_0$, $k_1$, $k_2$, $k_3$, $k_4$, $k_5$, and $k_6$ are calibration constants of the first and second thermistors, and $k_7$ is an empirically derived constant, and the processor deriving a signal representing the gas velocity and a signal representing the temperature of the gas.

In the preferred embodiment, $k_7$ is 2.33. Typically, a non-volatile memory is configured to store $k_0$, $k_1$, $k_2$, $k_3$, $k_4$, $k_5$, $k_6$ and $k_7$ calibration coefficients readable by the processor and used to calculate the gas velocity from the empirically derived equation.

This invention further features a gas velocity and temperature sensor system comprising a processor responsive to a flow signal from a first thermistor representative of the power dissipated as a function of the gas velocity and temperature of the first thermistor and a gas temperature signal from a second thermistor representative of the gas temperature proximate to the second thermistor, the processor configured to calculate the gas velocity using an empirically derived equation which is a function of a constant and the ratio of the power dissipated to the temperature difference between the temperature of the first thermistor and the gas temperature proximate the second thermistor. The processor derives a signal representing the gas flow velocity. Ideally, the processor derives a signal representing the temperature of the gas proximate the second thermistor.

In another design, the gas velocity and temperature sensor system of this invention comprises a processor responsive to a flow signal from a first thermistor representative of the power dissipated as a function of the gas velocity and temperature of the first thermistor and a temperature signal from a second thermistor representative of the gas temperature proximate to the second thermistor. The processor is ideally configured to calculate the gas velocity using an empirically derived equation which is function of a constant and the ratio of the power dissipated to the temperature difference between the temperature of the first thermistor and the gas temperature proximate the second thermistor, the microprocessor deriving a signal representing the gas velocity and a signal representing the temperature of the gas.

This invention also features a method for measuring the gas velocity and temperature, the method includes driving a first thermistor at a predetermined constant temperature, detecting a signal representative of the power dissipated as a function of the gas velocity of the first thermistor and a temperature signal representative of the temperature of the first thermistor, detecting a signal representative of the gas temperature proximate a second thermistor and calculating the gas velocity using an empirically derived equation in which the gas flow velocity is a function of a constant and the ratio of the power dissipated to the temperature difference between the temperature of the first thermistor and the temperature proximate the second thermistor.

In one embodiment, a constant temperature servo drives the first thermistor at a predetermined constant temperature. Ideally, the constant temperature servo provides the signal representative of the power dissipated as a function of gas velocity and the temperature of the first thermistor.

Preferably, an amplifier circuit detects the signal representative of the gas temperature. Typically, a processor calculates the gas velocity using the empirically derived equation. In one embodiment, the method for measuring gas velocity and temperature may include the step of storing the constant in a memory accessible and readable by the processor, and the step of converting the signal representative of the power dissipated as a function of gas velocity output by the constant temperature servo to a digital flow signal and converting the temperature signal representative of the temperature of the first thermistor to a first digital temperature signal. Ideally, an analog-to-digital converter converts the signal representative of the power and temperature of first thermistor to a digital flow signal and a first digital temperature.

In one example, the method further includes the step of converting the signal representative of the gas temperature proximate the second thermistor to a second digital temperature signal. Typically, an analog-to-digital converter converts the gas temperature proximate the second thermistor to a second digital temperature signal.

The method of measuring gas velocity and temperature of this invention may further include the step of converting the signal representative gas velocity calculated by the processor to an analog flow signal and converting the temperature signal representative of the temperature of the first thermistor to an analog temperature signal and also further include the step of converting the signal representative of the gas temperature proximate the second thermistor output by the processor to an analog temperature signal. In one embodiment, a digital-to-analog converter converts the digital signal representative of the gas velocity and digital signal representative of the gas temperature to an analog flow signal and an analog temperature signal.

This invention further features a method for measuring the gas velocity and temperature, including the steps of driving a first thermistor at a predetermined constant temperature, detecting a flow signal representative of the power dissipated as a function of the gas velocity of the first thermistor and a temperature signal representative of the temperature of the first thermistor, converting the flow signal and temperature signal to a digital flow signal and a first digital temperature signal, subtracting the quiescent power from the power dissipated in the first thermistor, measuring the gas temperature with a second thermistor configured to output a signal representing the gas temperature proximate the second thermistor, converting the signal representing the gas temperature to a second digital signal, subtracting the second digital temperature signal from the first digital temperature signal, deriving the digital gas temperature signal, calculating the compensated power x, using the equation $$x = k_0 \frac{(F - F_0)^2}{\Delta T} - k_1 \Delta T - k_2 T_A + k_3$$

calculating the gas flow velocity using the equation gas velocity $$\text{gas velocity} = k_4 x^{k_7} + k_5 \frac{1}{x^2} + k_6,$$

where x is the compensated power, F is the power dissipated in the first thermistor as a function of the gas velocity, $F_0$ is the quiescent power of the first thermistor, $\Delta T$ is the difference between temperature of the first thermistor and the gas temperature proximate the second thermistor, $k_0$, $k_1$, $k_2$, $k_3$, $k_4$, $k_5$, and $k_6$ are calibration constants of the first and second thermistors, and $k_7$ is an empirically derived constant; and deriving a signal representing the gas flow velocity and a signal representing the gas temperature.

This invention also features a gas velocity and temperature sensor system comprising a power dissipated and temperature sensing means driven at a constant temperature for outputting a flow signal representative of the power dissipated as a function of the gas velocity and a temperature signal representative of the temperature of the first power dissipated and temperature sensing means, a temperature sensing means for outputting a gas temperature signal representative of the gas temperature proximate the temperature sensing means, and means responsive to the flow signal and the temperature signals, for calculating gas velocity using an empirically derived equation in which gas flow velocity is function of a constant and the ratio of the power dissipated to the temperature difference between the temperature of the first thermistor and the gas temperature proximate the second thermistor. The means responsive to the flow signal and temperature signal derives a signal representing the gas velocity. Ideally, the power dissipated and temperature sensing means is a first thermistor, the temperature sensing means is a second thermistor, and the means responsive to the flow signal and temperature signal is a processor.

BRIEF DESCRIPTION OF THE DRAWINGS

Other objects, features and advantages will occur to those skilled in the art from the following description of a preferred embodiment and the accompanying drawings, in which:

FIGS. 6 and 7 are block diagrams showing various output stages of the gas velocity and sensor system in accordance with the subject invention;

DISCLOSURE OF THE PREFERRED EMBODIMENT

Figure 1:
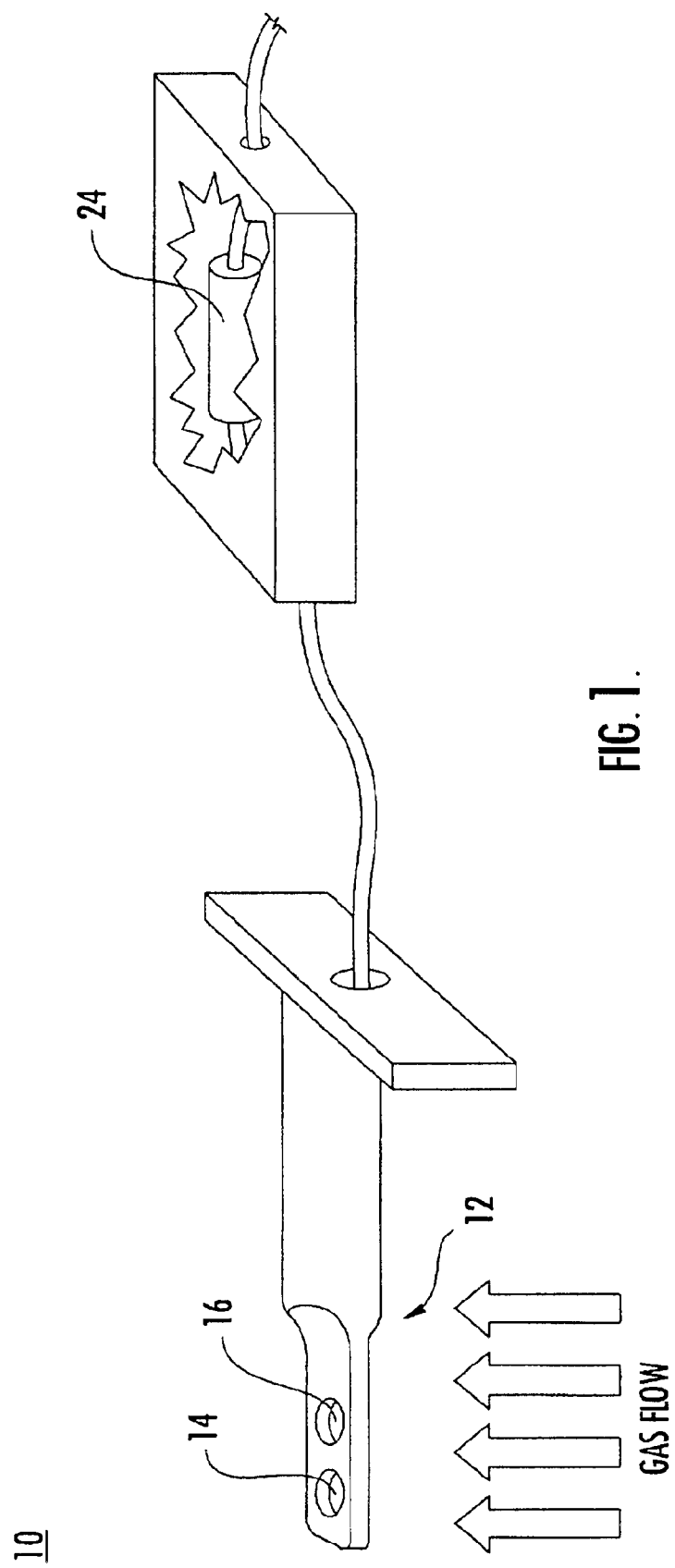
FIG. 1 is a schematic three-dimensional view of a typical gas velocity and temperature sensor system.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 2:
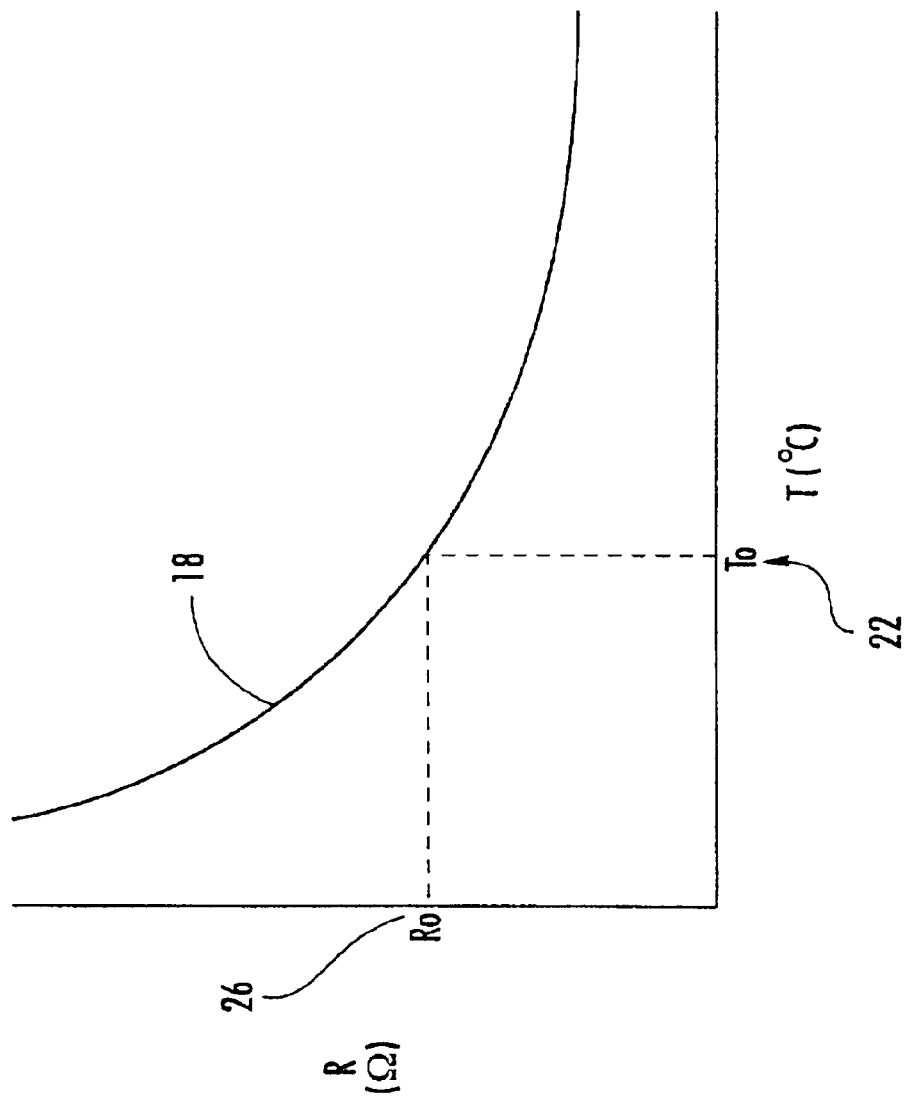
FIG. 2 is a graph showing the relationship between temperature and resistance in a thermistor.

As explained in the Background section above, the measurement of gas flow velocity and temperature within various systems is key to the operation of the systems. Typical gas velocity and temperature measurement system 10, FIG. 1 includes sensor or probe 12 with hot thermistor 14 and gas temperature thermistor 16. Hot thermistor 14 is typically maintained at a chosen temperature which is significantly higher than the temperature of the gas being measured, such as 100° C. above the gas temperature. Because the resistance and temperature of hot thermistor 14 are related by resistance and temperature curve 18, FIG. 2, a specific chosen temperature $T_0$ as shown at 22 (e.g., 150° C.) relates to specific resistance $R_0$ as shown at 26 (e.g., 100 ohms) of hot thermistor 14, FIG. 1. Changes in gas flow velocity proximate hot thermistor 14 change the power required to maintain hot thermistor 14 at resistance $R_0$ which is representative of the chosen temperature $T_0$. Typically, a constant temperature servo (not shown) connected to hot thermistor 14, FIG. 1 maintains hot thermistor 14 at constant resistance $R_0$ representative of chosen temperature $T_0$, and outputs a signal representative of the power (P) dissipated as a function of the gas velocity to maintain hot thermistor 14 at the chosen resistance $R_0$, as well as a signal representative of the temperature ($T_v$) of hot thermistor 14.

Gas temperature thermistor 16 measures the gas temperature of the gas flow being measured and another circuit (not shown) is configured to output a temperature signal proportional to the gas temperature ($T_A$) proximate thermistor 16. Now, $P=E_v^2/R_v$, are known as is $T_v$ and $T_A$ and, using equation (2) above, the gas velocity, v, can be calculated.

Typical prior art gas velocity and temperature sensor system 10 employs processor 24 which receives the signal representative of the power dissipated (P) as a function of the gas velocity and the temperature signals representative of the temperature of hot thermistor 14 ($T_v$) and gas temperature proximate gas thermistor 16 ($T_A$) to calculate the gas velocity using King's law as shown in equation (2). However, calculating gas velocity using King's law produces an inaccurate measurement of the gas velocity because King's law is based on the false assumption that thermistor 14 is a hot filament of infinite length.

Figure 3:
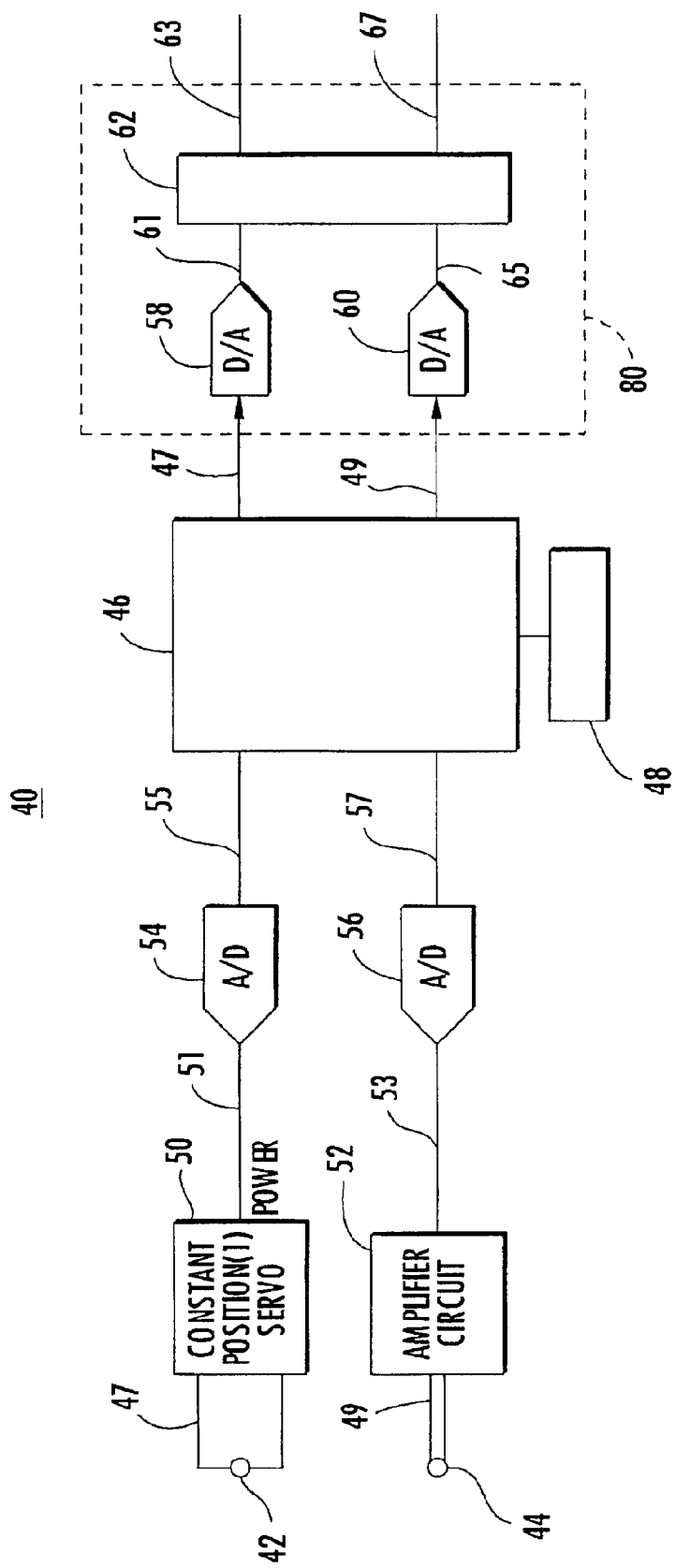
FIG. 3 is a block diagram of one embodiment of a gas velocity and sensor system of this invention.

In sharp contrast, gas velocity and temperature sensor system 40, FIG. 3 of the subject invention includes first thermistor 42 (e.g., THERMOMETRICS BR16PA223) driven at a constant temperature and configured to output a flow signal (P) representative of the power dissipated as a function of the gas velocity and a temperature signal ($T_v$) representative of the temperature of the first thermistor 42. Gas velocity and temperature sensor system 40 also includes second thermistor 44 which is configured to output a temperature signal ($T_A$) representative of the gas temperature proximate second thermistor 44 (e.g., THERMOMETRICS DC95TH303U). Gas velocity and temperature sensor system 40 further includes processor 46 (e.g., TOSHIBA TMP143120) which is responsive to the flow signal (P) and the temperature signals ($T_v$ and $T_A$) and is configured to calculate the gas velocity using a unique empirically derived equation in which the gas flow velocity is a function of a constant and the ratio of the power dissipated in first thermistor 42 (P) to the temperature difference between the temperature of first thermistor 42 ($T_v$) and the gas temperature proximate second thermistor 44 ($T_A$), e.g., ($T_v$-$T_A$). Processor 46 derives and outputs a signal representing the gas flow velocity proximate first thermistor 42. Ideally, processor 46 also derives and outputs a signal representing the temperature proximate second thermistor 44. In a preferred embodiment, the empirically derived equation is $$v \cong \left[\frac{kP}{\Delta T}\right]^{5/2} \quad (3)$$

where k is the constant representing the calibration constants of first thermistor 42 and second thermistor 44, P is the power dissipated in first thermistor 42 as a function of the gas velocity and temperature, and ΔT is the difference between the temperature of the first thermistor 42 ($T_v$) and the gas temperature proximate second thermistor 44 ($T_A$).

Unlike prior art systems which rely on the assumption of King's law that thermistor 42 is a hot filament of infinite length and hence produce an inaccurate measurement of gas velocity, the unique empirically derived equation as employed in the subject invention does not rely on such false assumptions and instead employs processor 46 to calculate gas flow velocity from the unique empirically derived equation (3) above which was derived by the inventors hereof through extensive trial, error, and experimentation. The result is a gas velocity and temperature system which provides an accurate calculation of gas flow velocity which is more representative of the actual gas flow velocity and temperature without the errors associated with assumptions found in King's law.

In the preferred embodiment of the subject invention, processor 46 is responsive to the flow signal and temperature signals and is configured to calculate the gas velocity proximate first thermistor 42 using the uniquely derived empirically derived equations:

$$x = k_0 \frac{(F - F_0)^2}{\Delta T} - k_1 \Delta T - k_2 T_A + k_3 \text{ and} \qquad (4)$$

$$\text{gas velocity} = k_4 x^{k_7} + k_5 \frac{1}{x^2} + k_6, \qquad (5)$$

where x is the compensated power, F is the power dissipated in first thermistor 42 as a function of the gas velocity, $F_0$ is the quiescent power of first thermistor 42 (e.g., the power to maintain first thermistor 42 at the temperature of the gas being measured), ΔT is the difference between temperature of the first thermistor 42 and the gas temperature proximate the second thermistor 44, $k_0$, $k_1$, $k_2$, $k_3$, $k_4$, $k_5$, and $k_6$ are calibration constants of the first and second thermistors, and $k_7$ is the empirically derived constant. In the preferred embodiment, $k_7$ is approximately 2.33.

As stated supra, the inventors hereof realized that the error of approximation associated with King's law produces inaccurate readings of gas velocity because King's law is based on the approximation that first thermistor 42 is a hot filament of infinite length, when in fact it is not. Through extensive experimentation the unique empirically derived equations as shown in equations (4) and (5) above (as well as equation (3) discussed supra) and the derived value of $k_7$ of approximately 2.33, as employed in equation (5) significantly reduce the error of approximation associated with King's law the result is significantly more accurate measurement of gas velocity and temperature.

Gas velocity and temperature sensor system 40 in accordance with this invention typically includes non-volatile memory 48 configured to store the values associated with k in equation (3) above (e.g., the calibration constants of first thermistor 42 and second thermistor 44). In the preferred embodiment, non-volatile memory 48 is configured to store the values associated with $k_0$, $k_1$, $k_2$, $k_3$, $k_4$, $k_5$, $k_6$, (e.g., the calibration constants of the first and second thermistors) and $k_7$ (e.g., the empirically derived constant) used in equations (4) and (5) above.

Non-volatile memory 48 is ideally accessible and readable by processor 46 and the values stored therein are used by processor 46 to calculate the gas velocity using empirically derived equations (3), (4), and (5) above. Although as shown in FIG. 3, non-volatile memory 48 stores the constants which represents the calibration constants of first thermistor 42, second thermistor 44, and/or the empirically derived constant, this is not a necessary limitation of this invention. In an alternate embodiment, processor 46 may store the constants which are readable by processor 46 to calculate the gas flow velocity from the empirically derived equation.

In a preferred example of this invention, the signal on line 47, FIG. 3 representing the gas flow velocity proximate first thermistor 42 and the temperature signal on line 49 representing the gas temperature output by processor 46 are voltages, but alternatively, the signals may be currents.

Figure 4A:
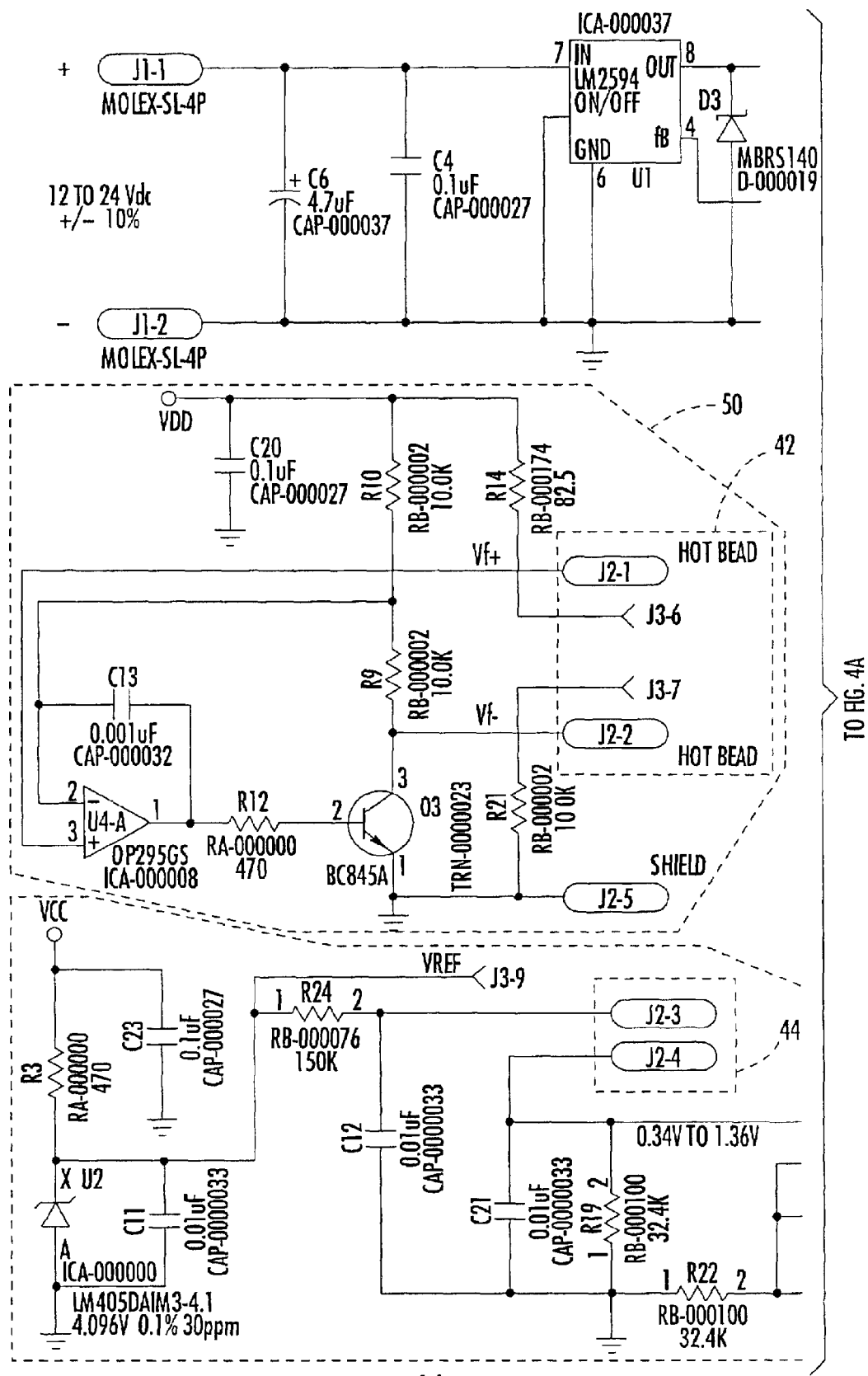
FIGS. 4 and 5 are circuit diagrams showing, in more detail, the primary circuitry associated with the gas velocity and sensor system of this invention.
Figure 4B:
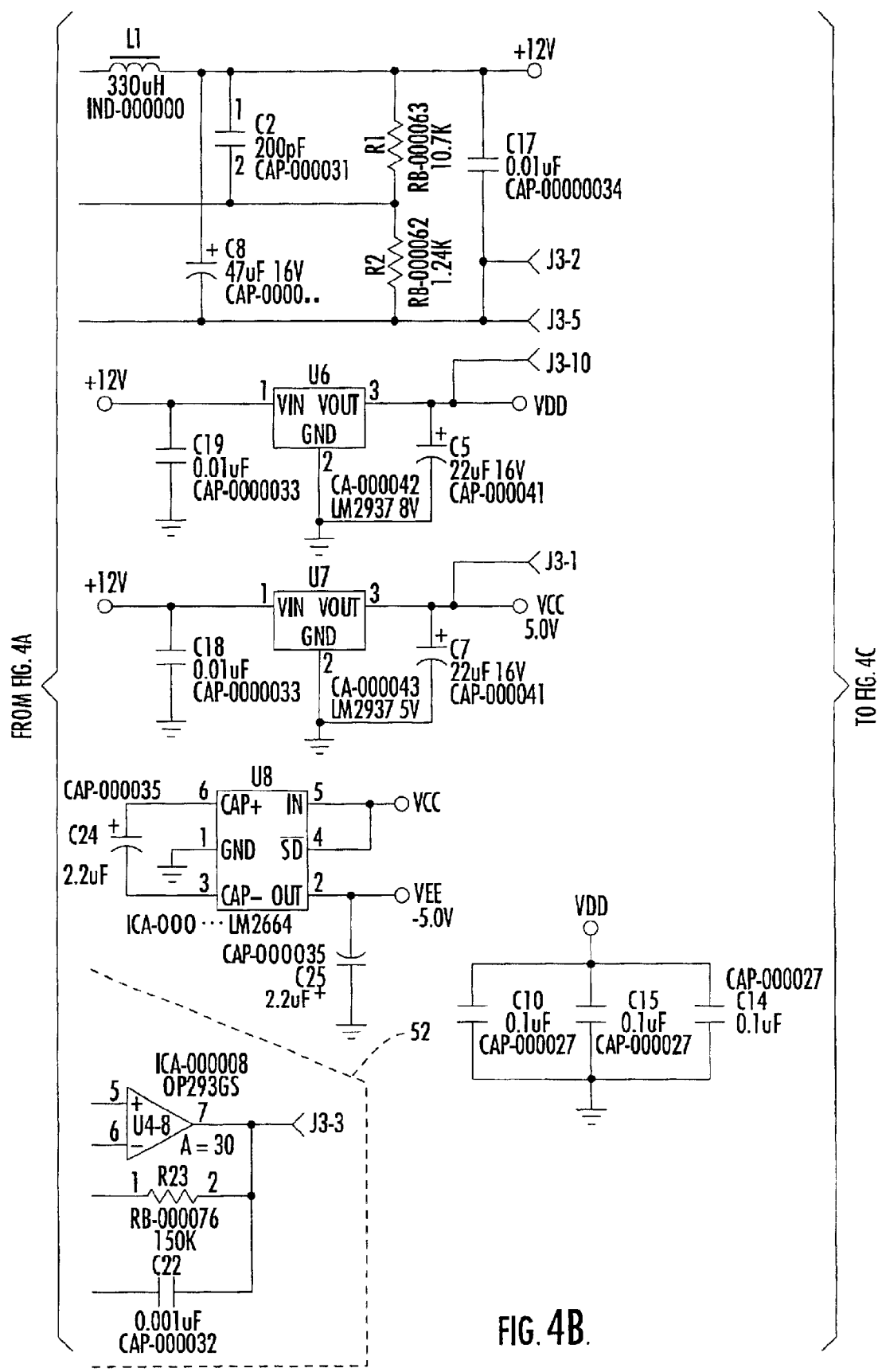
Figure 4C:
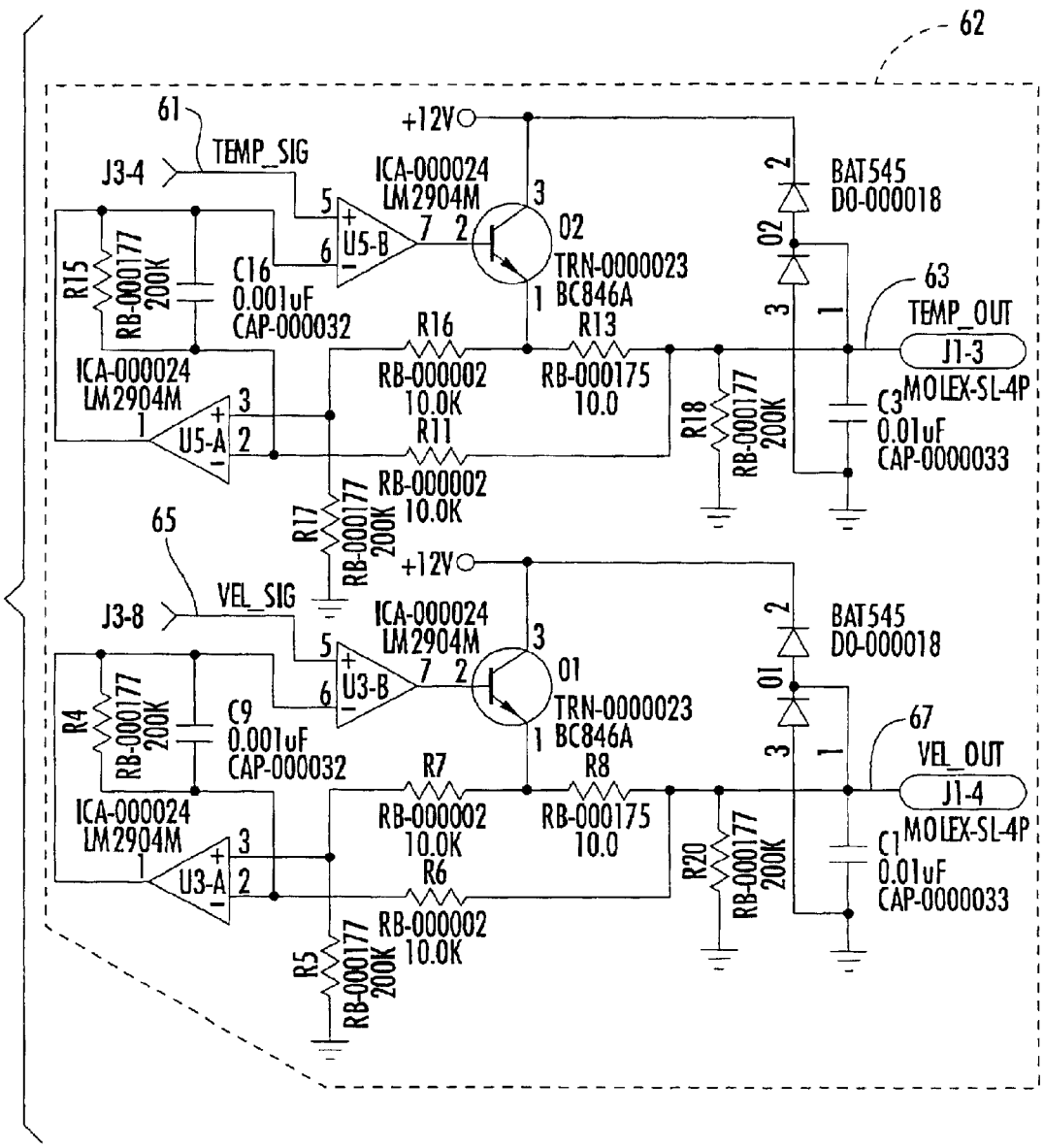

Gas velocity and temperature sensor system 40 typically includes constant temperature servo 50 which drives hot thermistor 42 at a specific resistance, (e.g., 100 ohms) representative of a specific chosen temperature (e.g., 150° C.) which is significantly higher than the temperature of the gas being measured (e.g., 50° C.). Constant temperature servo 50 outputs a signal on line 51 representative of the power dissipated as a function of the gas velocity to maintain hot thermistor 42 at the specific chosen resistance and a signal, also on line 51, representative of the temperature of hot thermistor 42. A more detailed schematic of first thermistor 42 connected to constant temperature servo 50 is shown in FIG. 4.

In one example of this invention, amplifier circuit 52, FIG. 3 is used to amplify the temperature signal representative of the gas temperature proximate second thermistor 44 on line 49 and output an amplified signal on line 53. A more detailed schematic of second thermistor 44 connected to amplifier circuit 52 is also shown in FIG. 4.

In one preferred example of this invention, analog-to-digital converter 54 (e.g., BURR-BROWN ADS1286), FIG. 3 converts the flow signal (F) and temperature signal ($T_v$) on line 51 to a digital flow signal and a digital temperature signal output on line 55. Similarly, analog-to-digital converter 56 converts the temperature signal ($T_A$) of the gas on line 53 to a digital gas temperature signal output on line 57. The digital flow signal F and temperature signals ($T_v$ and $T_A$) are input to processor 46 on lines 55 and 57, which, as described in detail above, uniquely calculates the gas velocity using empirically derived equations (3), and/or (4) and (5). Although as shown in FIG. 3, analog-to-digital converters 54 and 56 are used to convert the flow signal and temperature signals from analog to digital form, this is not a necessary limitation of this invention as processor 46 may also receive the analog flow signal and temperature signals on lines 51 and 53 in analog form.

In one example, in accordance with the subject invention first thermistor 42 and second thermistor 44 are responsive to laminar gas flow. In a preferred embodiment, first thermistor 42 and second thermistor 44 are configured to be responsive to all types of gases. In one example, first thermistor 42 and second thermistor 44 are configured to be responsive to argon, oxygen, nitrogen, and helium.

Figure 5A:
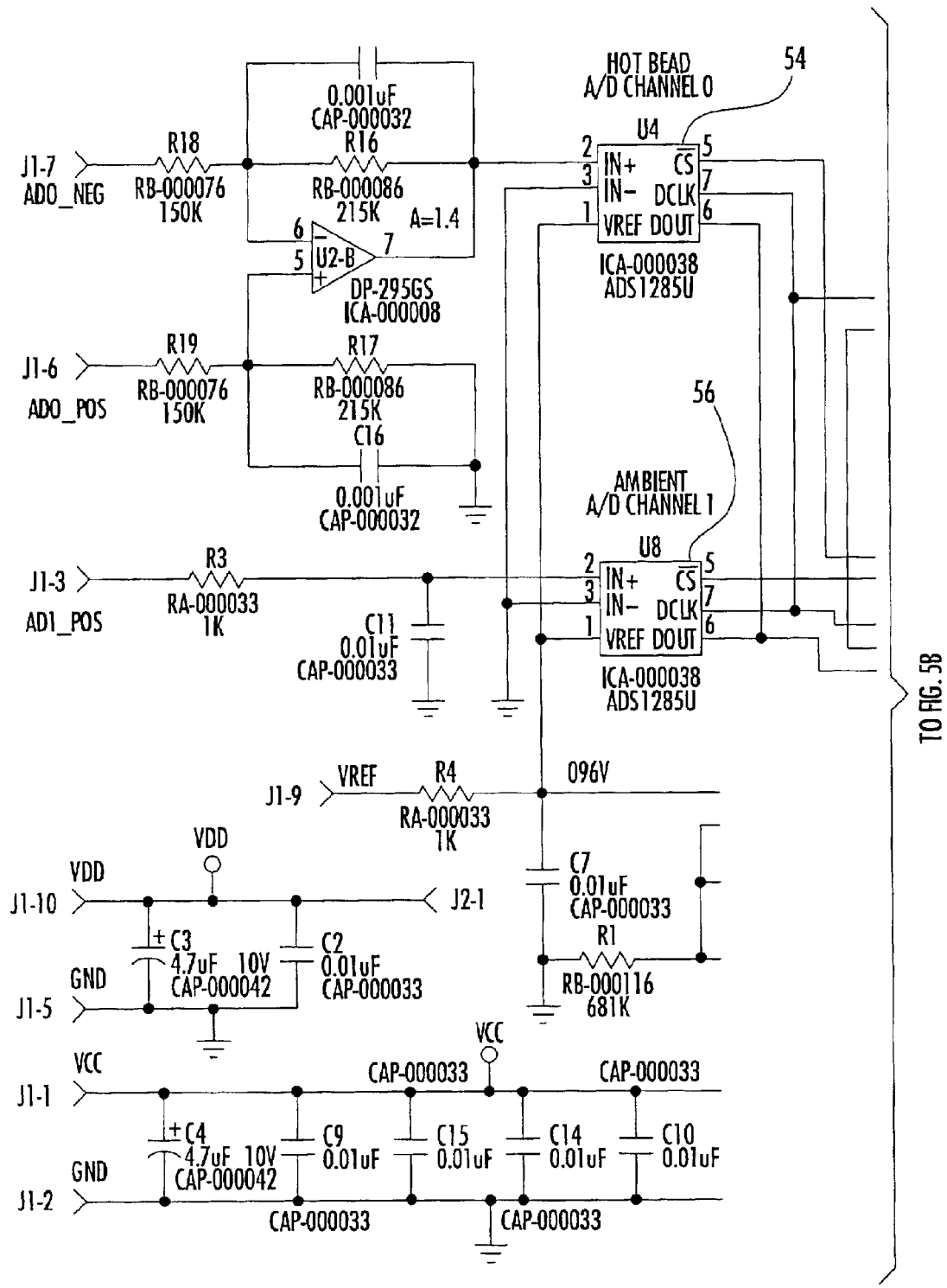
Figure 5B:
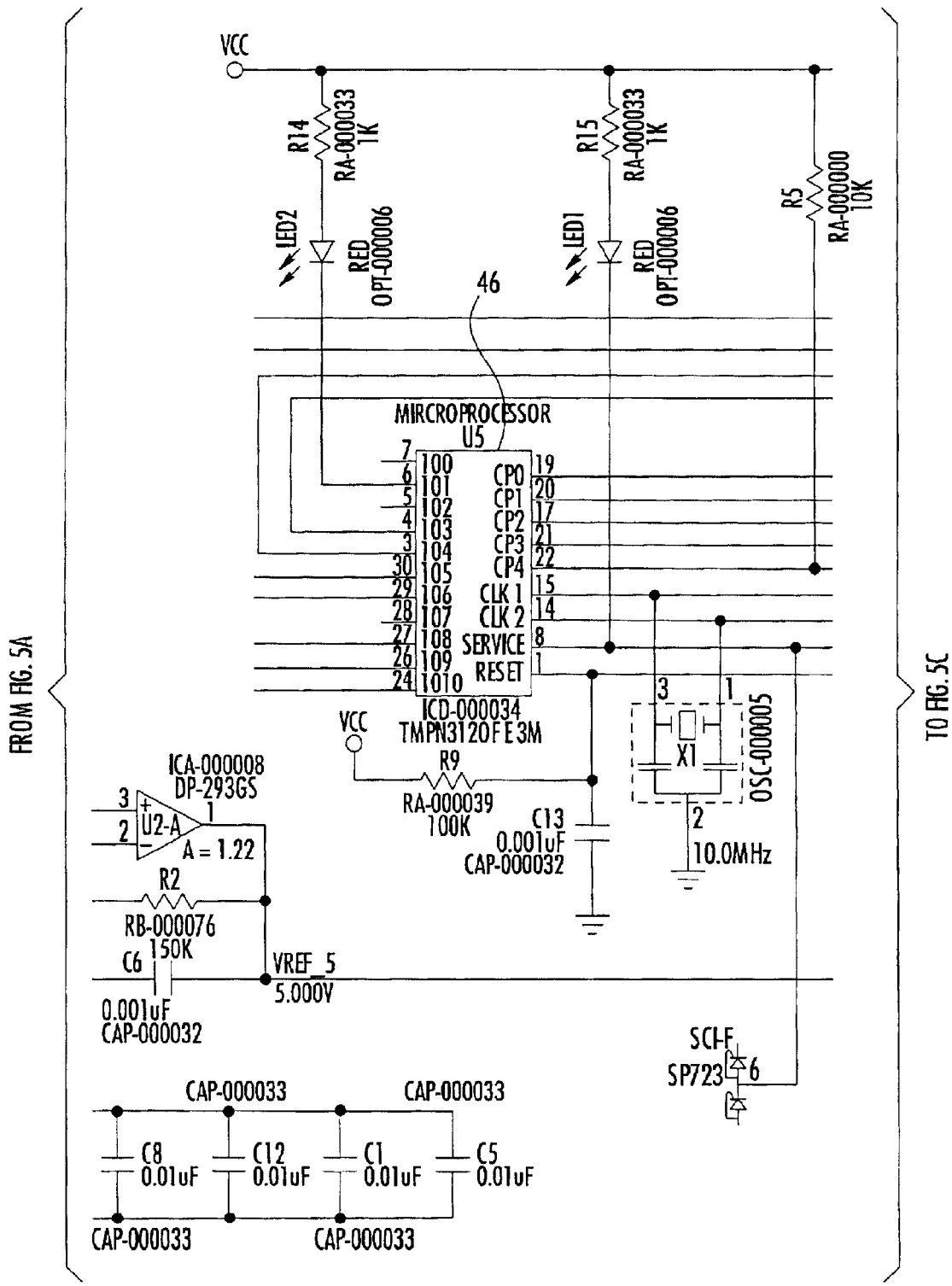
Figure 5C:
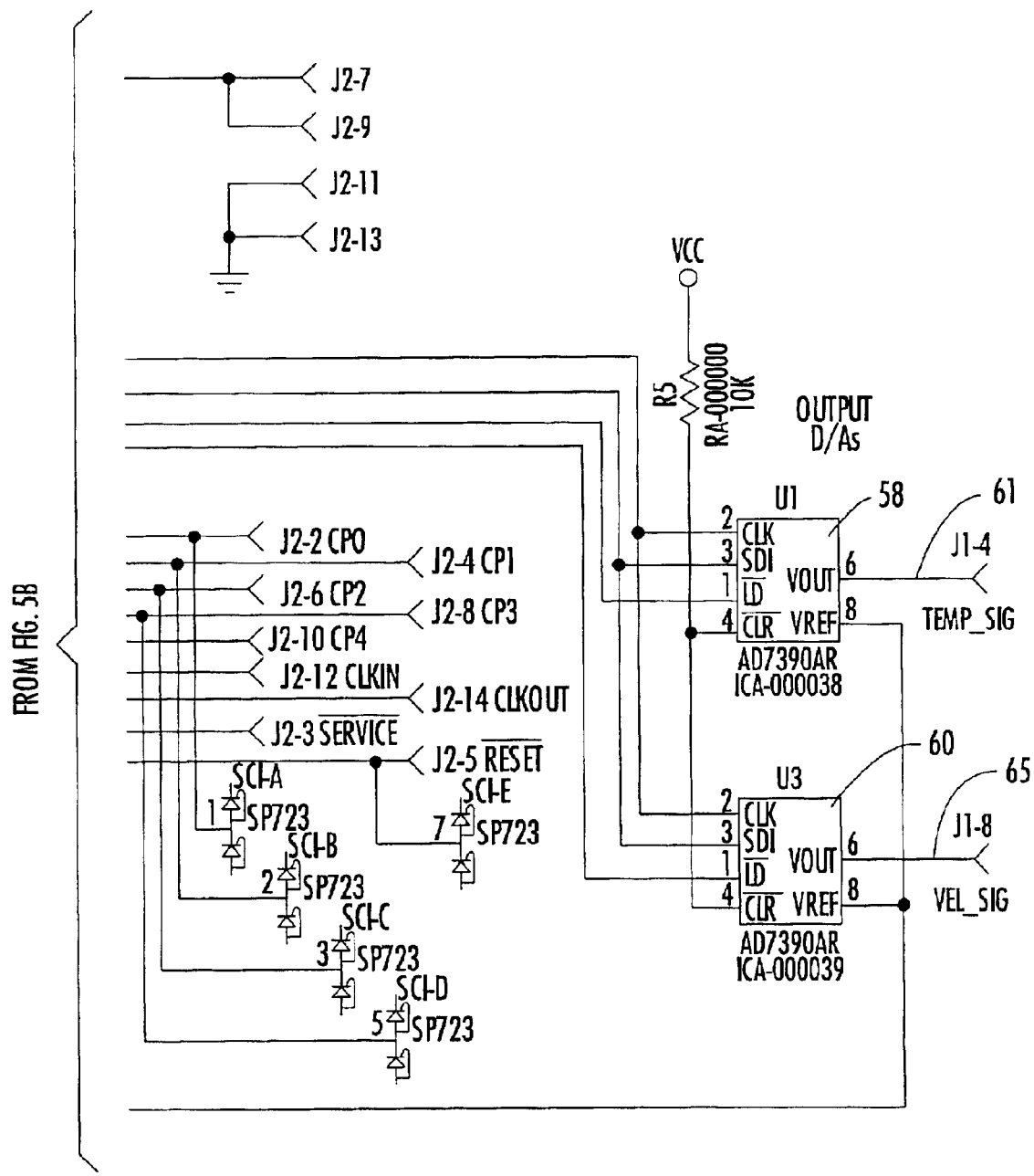

In one preferred example of this invention, gas velocity and temperature sensor system 40, FIG. 3 includes optional output stage 80 which may include digital-to-analog converter 58 (e.g., ANALOG DEVICES AD7390) which converts the digital signal representing the gas flow velocity output by processor 46 on line 47 to an analog signal on line 61. Similarly, digital-to-analog converter 60 converts the digital temperature signal representing the gas temperature output by processor 46 on line 49 to an analog signal on line 65. The interconnections between digital-to-analog converters 58 and 60 and processor 46 are shown in FIG. 5.

Output stage 80, FIG. 3 typically includes output drive circuit 62 (shown in greater detail in FIG. 4) which conditions the analog gas velocity signal on line 61 and the temperature signal on line 65 to be in various voltage and current ranges in accordance with industry standards used by a vast array of applications as discussed in the Background section above, such as sensitive electronic components, refrigeration systems, gas conditioning systems, biocontainment systems, gas supply applications, industrial process control of gas mixing and weather applications, and the like. For example, in one embodiment of this invention output drive circuit 62 is configured to output industry standard analog voltage and current signals representing gas velocity on line 63 and the gas temperature on line 65 in the range of 0–5 volts, 0–10 volts, 0–20 mA, and 4–20 mA, as shown in FIG. 6. In an alternate embodiment, gas velocity and temperature sensor system 40 may include output stage 90 of similar design as output stage 80, except the gas velocity signal output from drive circuit 62 on line 63 and gas temperature signal output on line 65 are input into network interface 190, FIG. 7 which interfaces with computer control network 192.

Figure 8:
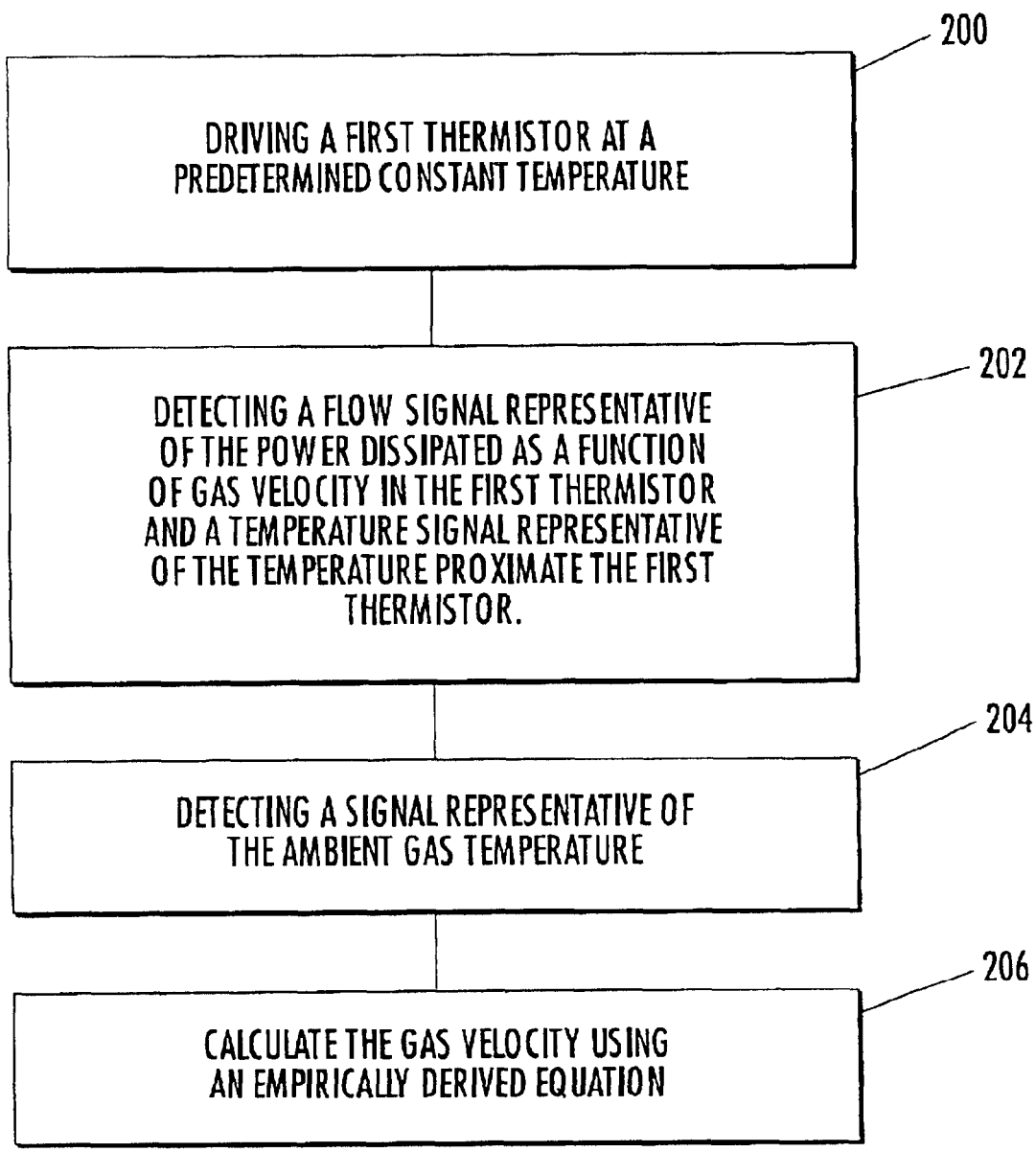
FIG. 8 is a flow chart showing one method for calculating gas flow velocity and temperature in accordance with this invention.

The method for measuring the gas velocity and temperature of this invention includes the steps of: driving first thermistor 42, FIG. 3 at a constant temperature, step 200, FIG. 8; detecting a flow signal representative of the power dissipated as a function of gas velocity in first thermistor 42, FIG. 3 and a temperature signal ($T_v$) representative of the temperature of first thermistor 42, step 202, FIG. 3; detecting a signal representative of the gas temperature ($T_A$) proximate second thermistor 44, FIG. 3, step 204, FIG. 8; and calculating the gas velocity using the empirically derived equations discussed above in which the gas flow velocity is a function of a constant and the ratio of the power dissipated to the temperature difference between the temperature proximate the first thermistor and the gas temperature proximate the second thermistor, step 206. Microprocessor 46, FIG. 3 is typically used and programmed to carry out all the steps of FIG. 8.

Figure 9:
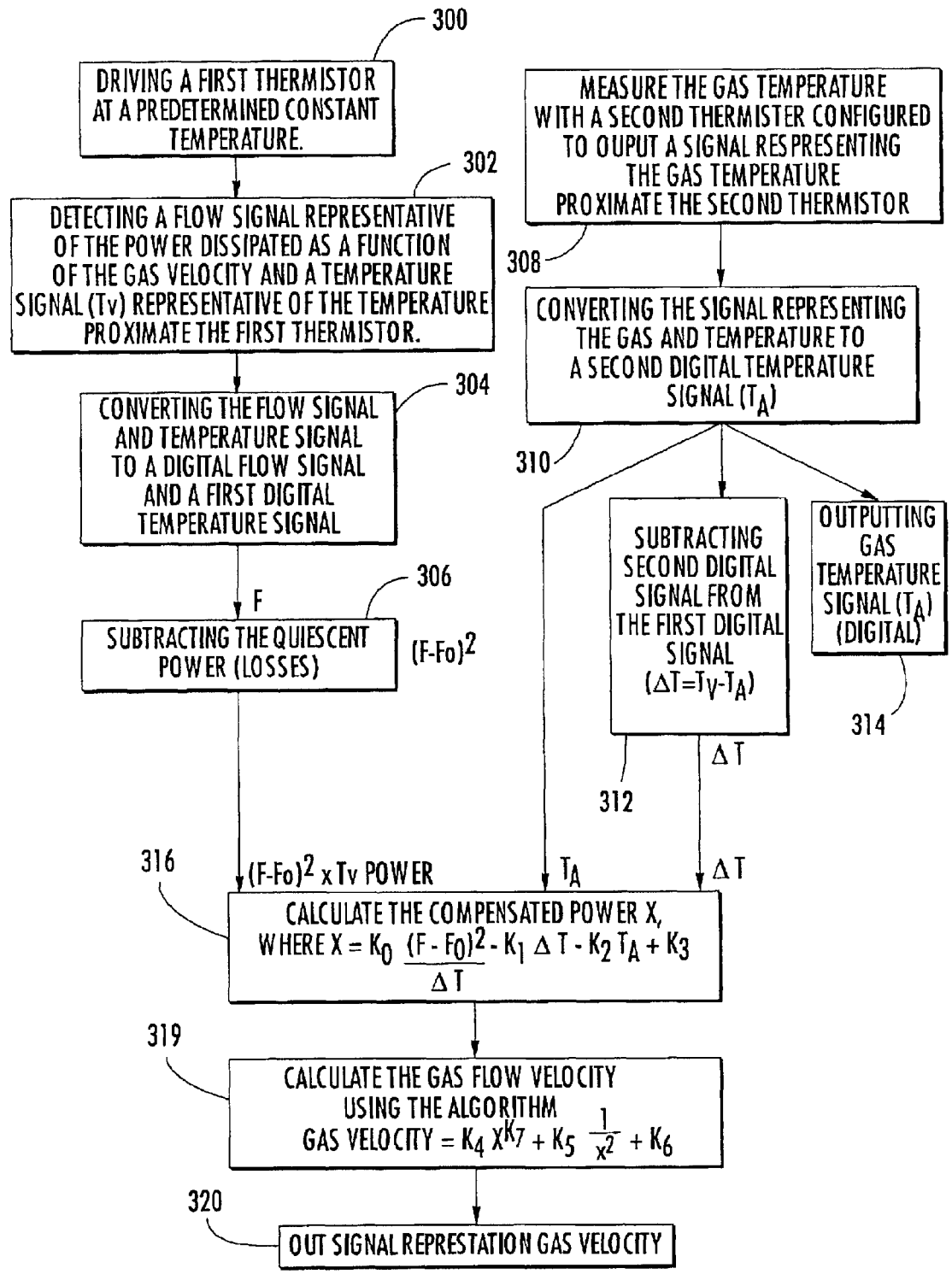
FIG. 9 is a flow chart showing, in more detail, the primary steps of the method of calculating gas flow velocity and temperature in accordance with this invention.

In step 300, FIG. 9 first thermistor 42, FIG. 3 is driven at a predetermined constant temperature, such as 150° C. At step 302, a flow signal (F) representative of the power dissipated as a function of the gas velocity is detected, as is a temperature signal ($T_v$) representing the temperature of the first thermistor 42. In step 304, the flow signal (F) and the temperature signal ($T_v$) are converted to a digital flow signal and a first digital temperature signal by analog-to-digital converter 54, FIG. 3. In step 306, FIG. 9 the quiescent power ($F_0$) signal of first thermistor 42 is subtracted from the flow signal (F). In step 308, FIG. 9 the gas temperature is measured with second thermistor 44, FIG. 3 which is configured to output a signal representing the gas temperature ($T_A$) proximate the second thermistor 44. In step 310, FIG. 9 the signal representing the gas temperature ($T_A$) is converted to a second digital temperature signal by analog-to-digital converter 56, FIG. 3. The second digital temperature signal is subtracted from the first digital temperature signal by processor 46, FIG. 3, step 312, as shown in FIG. 9. In step 314, the gas temperature signal ($T_A$) is derived and output by processor 46. In step 316, the compensated power, x, is calculated by processor 46 using the equation:

$$x = k_0 \frac{(F - F_0)^2}{\Delta T} - k_1 \Delta T - k_2 T_A + k_3,$$

In step 318, the gas flow velocity is calculated by processor 46 using the equation:

$$\text{gas velocity} = k_4 x^{k_7} + k_5 \frac{1}{x^2} + k_6,$$

As noted above, x is the compensated power, F is the power dissipated in the first thermistor 42 as a function of the gas velocity, $F_0$ is the quiescent power of the first thermistor 42, $\Delta T$ is the difference between temperature of first thermistor 42 ($T_v$) and the gas temperature proximate the second thermistor 44 ($T_A$). The calibration constants of the first and second thermistors are $k_0$, $k_1$, $k_2$, $k_3$, $k_4$, $k_5$, and $k_6$, and $k_7$ is the empirically derived constant equal to approximately 2.33. In step 320, processor 46, FIG. 3 derives and outputs the signal representing the gas flow velocity.

As shown above, the unique gas flow and temperature sensor system of the subject invention accurately measures the gas flow velocity and temperature without relying on erroneous approximations as found in King's law. The innovative design of the gas velocity and temperature sensor system uses the unique empirically derived equation discussed above which reduces the error of approximation found in King's law and yields significantly more accurate measurement of gas flow velocity and temperature proximate the sensor.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A gas velocity and temperature sensor comprising:
    a first thermistor driven at a constant temperature and configured to output a flow signal representive of the power dissipated as a function of the gas velocity and a temperature signal representative of the temperature of the first thermistor;
    a second thermistor configured to output a gas temperature signal representative of the gas temperature proximate the second thermistor; and
    a processor responsive to the flow signal and the temperature signals, the processor configured to calculate gas velocity using the empirically derived equation $$v \cong \left[\frac{kP}{\Delta T}\right]^{5/2}$$

where k is the constant representing calibration constants of the first and second thermistors, P is the power dissapated and $\Delta T$ is the difference between the temperature of the first thermistor and the gas temperature proximate the second thermistor, the processor deriving a signal representing the gas velocity.

2. The gas velocity sensor system of claim 1 in which the processor also derives a signal representing the temperature of the gas proximate the second thermistor.

3. The gas velocity sensor system of claim 1 further including a non-volatile memory configured to store the constant k accessible and readable by the processor to calculate the gas velocity from the empirically derived equation.

4. The gas velocity sensor system of claim 1 in which the processor stores the constant k accessible to calculate the gas velocity from the empirically derived equation.

5. The gas velocity sensor system of claim 1 in which the flow signal and the temperature signals are voltages.

6. The gas velocity sensor system of claim 1 in which the flow signal and the temperature signal are currents.

7. The gas velocity and temperature sensor system of claim 1 further including a constant temperature servo connected between the first thermistor and the processor to drive the first thermistor at constant resistance equal to a predetermined constant temperature.

8. The gas velocity sensor system of claim 7 further including an analog-to-digital converter connected between the constant temperature servo and the processor configured to convert the flow signal and the temperature signal of the first thermistor to a digital flow signal and a first digital temperature signal.

9. The gas velocity and temperature sensor system of claim 1 further including an amplifier circuit connected between the second thermistor and the processor to amplify the gas temperature signal output by the second thermistor.

10. The gas velocity sensor system of claim 9 further including an analog-to-digital converter connected between the amplifier circuit and the processor configured to convert the gas temperature signal to a second digital temperature signal.

11. The gas velocity sensor system of claim 10 further including a digital-to-analog converter connected between the processor and an output drive circuit configured to convert the signal representing the gas flow velocity and the signal representing the temperature of the gas derived by the processor to an analog flow signal and an analog temperature signal.

12. The gas velocity and temperature sensor system of claim 11 in which the drive circuit is configured to condition the analog flow signal and analog temperature signal to be output in the range of 0–5 volts.

13. The gas velocity and temperature sensor system of claim 11 in which the drive circuit is configured to condition the analog flow signals and analog temperature signal to be output in the range of 0–10 volts.

14. The gas velocity and temperature sensor system of claim 11 in which the drive circuit is configured to condition the analog flow signal and analog temperature signal to be output in the range of 0–20 milliamperes.

15. The gas velocity and temperature sensor system of claim 11 in which the drive circuit is configured to condition the analog flow signal and analog temperature signal to be output in the range of 4–20 milliamperes.

16. A gas velocity and temperature sensor system comprising:
    a first thermistor driven at a constant temperature and configured to output a flow signal representative of the power dissipated as a function of the gas velocity and a temperature signal representative of the temperature of the first thermistor;
    a second thermistor configured to output a gas temperature signal representative of the gas temperature proximate the second thermistor; and
    a processor responsive to the flow signal and the temperature signals, the processor configured to calculate gas velocity using the empirically derived equation $$v \cong \left[\frac{kP}{\Delta T}\right]^{5/2}$$

where k is the constant representing calibration constants of the first and second thermistors, P is the power dissipated, Δt is the difference between the temperature of the first thermistor and the gas temperature proximate the second thermistor, the processor deriving a signal representing the gas flow velocity and a signal representing the temperature of the gas.

17. A gas velocity and temperature sensor system comprising:
    a first thermistor driven at a constant temperature and configured to output a flow signal proportional to the power dissipated as a function of the gas velocity and a temperature signal representative of the temperature proximate the thermistor
    a second thermistor configured to output a gas temperature signal proportional to the gas temperature proximate to the second thermistor; and
    a processor responsive to the flow signal and the temperature signals configured to calculate gas velocity using the empirically derived equation:

$$v \cong \left[\frac{kP}{\Delta T}\right]^{5/2}$$

where k is a constant, P is the power dissipated as a function of the gas velocity, and ΔT is the difference between the temperature of the first thermistor and gas temperature proximate to the second thermistor, the processor deriving a signal representing the gas velocity.

18. The gas velocity sensor system of claim 17 in which the processor also derives a signal representing the temperature of the gas.

19. The system of claim 17 further including a non-volatile memory configured to store the constant k which represents the calibration coefficients of the first and second thermistors, the memory readable by the processor to calculate the gas velocity from the empirically derived equation.

20. A gas velocity and temperature sensor system comprising:
    a first thermistor driven at a constant temperature and configured to output a flow signal proportional to the power dissipated as a function of the gas velocity and a temperature signal representative of the temperature of the first thermistor;
    a second thermistor configured to output a gas temperature signal proportional to the gas temperature proximate to the second thermistor; and
    a processor responsive to the flaw signal and the temperature signals configured to calculate gas velocity using the equation:

$$v \cong \left[\frac{kP}{\Delta T}\right]^{5/2}$$

where k is a constant, P is the power dissipated as a function of the gas velocity, and ΔT is the difference between the temperature of the first thermistor and gas temperature proximate to the second thermistor, the processor deriving a signal representing the gas velocity and a signal representing the temperature of the gas.

21. A gas velocity and temperature sensor system comprising:
- a first thermistor driven at a constant temperature and configured to output a flow signal representative of the power dissipated as a function of the gas velocity and a temperature signal representative of the temperature of the first thermistor;
- a second thermistor configured to output a gas temperature signal representative of the gas temperature proximate to the second thermistor;
- a processor responsive to the flow signal and the temperature signals configured to calculate the gas velocity proximate the sensor using the empirically derived equations:

$$x = k_0 \frac{(F - F_0)^2}{\Delta T} - k_1 \Delta T - k_2 T_A + k_3 \text{ and}$$

$$\text{gas velocity} = k_4 x^{k_7} + k_5 \frac{1}{x^2} + k_6,$$

where x is the compensated power, F is the power dissipated in the first thermistor as a function of the gas velocity, $F_0$ the quiescent power of the first thermistor, $\Delta T$ is the difference between temperature of the first thermistor and the gas temperature proximate the second thermistor, $k_0$, $k_1$, $k_2$, $k_3$, $k_4$, $k_5$, and $k_6$ are calibration constants of the first and second thermistors, and $k_7$ is an empirically derived constant; and
the processor deriving a signal representing the gas velocity and a signal representing the temperature of the gas.

22. The gas velocity and temperature sensor of claim 21 in which $k_7$ is 2.33.

23. The sensor system of claim 21 further including a non-volatile memory configured to store $k_0$, $k_1$, $k_2$, $k_3$, $k_4$, $k_5$, $k_6$ and $k_7$ calibration coefficients readable by the process and used to calculate the gas velocity from the empirically derived equation.

24. A gas velocity and temperature sensor system comprising:
- a processor responsive to a flow signal from a first thermistor representative of the power dissipated as a function of the gas velocity and temperature of the first thermistor and a gas temperature signal from a second thermistor representative of the gas temperature proximate to the second thermistor, the processor configured to calculate the gas velocity using the empirically derived equation $$v \cong \left[\frac{kP}{\Delta T}\right]^{5/2}$$

where k is the constant representing calibration constants of the first and second thermistors, P is the power dissipated, and $\Delta T$ is the difference between the temperature of the first thermistor and the gas temperature proximate the second thermistor, the processor deriving a signal representing the gas flow velocity.

25. The gas velocity sensor system of claim 24 in which the processor derives a signal representing the temperature of the gas proximate the second thermistor.

26. A gas velocity and temperature sensor system comprising:
- a processor responsive to a flow signal from a first thermistor representative of the power dissipated as a function of the gas velocity and temperature of the first thermistor and a temperature signal from a second thermistor representative of the gas temperature proximate to the second thermistor, the processor configured to calculate the gas velocity using the empirically derived equation $$v \cong \left[\frac{kP}{\Delta T}\right]^{5/2}$$

where k is the constant representing calibration constants of the first and second thermistors, P is the power dissipated, and $\Delta T$ is the difference between the temperature of the first thermistor and the gas temperature proximate the second thermistor, the microprocessor deriving a signal representing the gas velocity and a signal representing the temperature of the gas.

27. A method for measuring the gas velocity and temperature, the method comprising:
- driving a first thermistor at a predetermined constant temperature;
- detecting a signal representative of the power dissipated as a function of the gas velocity of the first thermistor and a temperature signal representative of the temperature of the first thermistor;
- detecting a signal representative of the gas temperature proximate a second thermistor; and
- calculating the gas velocity using the empirically derived equation $$v \cong \left[\frac{kP}{\Delta T}\right]^{5/2}$$

where k is the constant representing calibration constants of the first and second thermistors, P is the power dissipated, and $\Delta T$ is the difference between the temperature of the first thermistor and the temperature proximate the second thermistor.

28. The method of claim 27 in which a constant temperature servo drives the first thermistor at a predetermined constant temperature.

29. The method of claim 28 in which the constant temperature servo provides the signal representative of the power dissipated as a function of gas velocity and the temperature of the first thermistor.

30. The method of claim 29 further including the step of converting the signal representative of the power dissipated as a function of gas velocity output by the constant temperature servo to a digital flow signal and converting the temperature signal representative of the temperature of the first thermistor to a first digital temperature signal.

31. The method of claim 30 in which an analog-to-digital converter converts the signal representative of the power and temperature of first thermistor to a digital flow signal and a first digital temperature.

32. The method of claim 27 in which an amplifier circuit amplifies the signal representative of the gas temperature.

33. The method of claim 32 further including the step of converting the signal representative of the gas temperature proximate the second thermistor to a second digital temperature signal.

34. The method of claim 33 in which an analog-to-digital converter converts the gas temperature proximate the second thermistor to a second digital temperature signal.

35. The method of claim 27 in which a processor calculates the gas velocity using the empirically derived equation.

36. The method of claim 35 further including the step of storing the constant in a memory accessible and readable by the processor.

37. The method of claim 35 further including the step of converting the signal representative gas velocity calculated by the processor to an analog flow signal.

38. The method of claim 35 further including the step of converting the signal representative of the gas temperature proximate the second thermistor output by the processor to an analog temperature signal.

39. The method of claim 38 in which a digital-to-analog converter converts the digital signal representative of the gas velocity and digital signal representative of the gas temperature to an analog flow signal and an analog temperature signal.

40. The method of claim 39 in which an output drive circuit conditions the analog flow signal and the analog temperature signal to be in the range of 0–5 volts.

41. The method of claim 39 in which an output drive circuit conditions the analog flow signal and the analog temperature signal to be in the range of 0–10 volts.

42. The method of claim 39 in which an output drive circuit conditions the analog flow signal and the analog temperature signal to be in the range of 0–20 milliamperes.

43. The method of claim 39 in which an output drive circuit conditions the analog flow signal and the analog temperature signal to be in the range of 4–20 milliamperes.

44. A method for measuring the gas velocity and temperature, the method comprising the step of:

driving a first thermistor at a predetermined constant temperature;

detecting a flow signal representative of the power dissipated as a function of the gas velocity of the first thermistor and a temperature signal representative of the temperature of the first thermistor;

converting the flow signal and temperature signal to a digital flow signal and a first digital temperature signal;

subtracting the quiescent power from the power dissipated in the first thermistor;

measuring the gas temperature with a second thermistor configured to output a signal representing the gas temperature proximate the second thermistor;

converting the signal representing the gas temperature to a second digital signal;

subtracting the second digital temperature signal from the first digital temperature signal;

deriving the digital gas temperature signal;

calculating the compensated power x, using the equation:

$$x = k_0 \frac{(F - F_0)^2}{\Delta T} - k_1 \Delta T - k_2 T_A + k_3$$

calculating the gas flow velocity using the equation:

$$\text{gas velocity} = k_4 x^{k_7} + k_5 \frac{1}{x^2} + k_6,$$

where x is the compensated power, F is the power dissipated in the first thermistor as a function of the gas velocity, $F_0$ is the quiescent power of the first thermistor, $\Delta T$ is the difference between temperature of the first thermistor and the gas temperature proximate the second thermistor, $k_0$, $k_1$, $k_2$, $k_3$, $k_4$, $k_5$, and $k_6$ are calibration constants of the first and second thermistors, and $k_7$ is an empirically derived constant; and deriving a signal representing the gas flow velocity and a signal representing the gas temperature.

45. A gas velocity and temperature sensor system comprising:

a power dissipated and temperature sensing means driven at a constant temperature for outputting a flow signal representative of the power dissipated as a function of the gas velocity and a temperature signal representative of the temperature of the first power dissipated and temperature sensing means;

a temperature sensing means for outputting a gas temperature signal representative of the gas temperature proximate the temperature sensing means; and means responsive to the flow signal and the temperature signals, for calculating gas velocity using the empirically derived equation $$v \cong \left[\frac{kP}{\Delta T}\right]^{5/2}$$

where k is the constant representing calibration constants of the first and second thermistors, P is the power dissipated, and $\Delta T$ is the difference between the temperature of the first thermistor and the gas temperature proximate the second thermistor, the means responsive to the flow signal and the temperature signals deriving a signal representing the gas velocity.

46. The gas velocity and temperature system of claim 45 in which the power dissipated and temperature sensing means is a first thermistor.

47. The gas velocity and temperature system of claim 45 in which the temperature sensing means is a second thermistor.

48. The gas velocity and temperature system of claim 45 in which the means responsive to the flow signal and temperature signal is a processor.

* * * * *